United States Patent
Walewski

(10) Patent No.: US 8,401,394 B2
(45) Date of Patent: Mar. 19, 2013

(54) METHOD FOR NON-FLUTTER TRANSMISSION OF DIGITAL DATA IN A FREE-SPACE OPTICAL TRANSMISSION SYSTEM

(75) Inventor: Joachim Walewski, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 320 days.

(21) Appl. No.: 12/918,383

(22) PCT Filed: Feb. 25, 2009

(86) PCT No.: PCT/EP2009/052220
§ 371 (c)(1),
(2), (4) Date: Aug. 19, 2010

(87) PCT Pub. No.: WO2009/106542
PCT Pub. Date: Sep. 3, 2009

(65) Prior Publication Data
US 2010/0316389 A1   Dec. 16, 2010

(30) Foreign Application Priority Data
Feb. 29, 2008 (DE) .......................... 10 2008 011 823

(51) Int. Cl.
H04B 10/00 (2006.01)
(52) U.S. Cl. ........ 398/130; 398/128; 398/135; 398/118; 398/119; 398/136; 398/172; 398/138; 398/182; 398/183; 398/193; 398/194; 375/238; 375/295; 375/259
(58) Field of Classification Search .................. 398/172, 398/130, 127, 128, 182, 183, 186, 187, 189, 398/190, 191, 192, 118, 119, 124, 135, 136, 398/158, 159, 193, 196, 194, 138; 375/238, 375/295, 239, 259, 242
See application file for complete search history.

(56) References Cited

U.S. PATENT DOCUMENTS 5,706,115 A    1/1998   Hirayama et al. ............ 359/172
(Continued)

FOREIGN PATENT DOCUMENTS

CN    1933369 A       3/2007
DE    102006058156    6/2008
(Continued)

OTHER PUBLICATIONS

Japan Office Action, Japanese Patent application No. 2010-548095, 16 pages, Mar. 7, 2012.
(Continued)

*Primary Examiner* — Hanh Phan
(74) *Attorney, Agent, or Firm* — King & Spalding L.L.P.

(57) ABSTRACT

In a method for transmission of digital data in an optical free-space transmission system in which a binary code sequence produced from the digital data is used to transmit amplitude-modulated light waves across an optical free space between a transmitter and a receiver, according to a first aspect, the binary code sequence is produced such that a modulation frequency of the light waves determined by the binary code sequence has a value of 70 Hertz. According to a second aspect, 't' light waves are modulated with the binary code sequence and binary data are transmitted in blocks during a first time period, and non-modulated light waves are emitted during second time periods, wherein the light intensities of the time periods are selected so that the quantities of light transmitted in two periods correspond to predetermined quantities of light.

20 Claims, 2 Drawing Sheets

U.S. PATENT DOCUMENTS

| | | | |
|---|---|---|---|
| 5,726,786 A * | 3/1998 | Heflinger | 398/128 |
| 6,292,896 B1 | 9/2001 | Guski et al. | 713/169 |
| 6,601,175 B1 | 7/2003 | Arnold et al. | 713/202 |
| 7,389,051 B2 | 6/2008 | Morioka et al. | 398/127 |
| 7,689,130 B2 * | 3/2010 | Ashdown | 398/172 |
| 7,949,259 B2 | 5/2011 | Suzuki | 398/172 |
| 2004/0247323 A1 | 12/2004 | Morioka et al. | 398/140 |
| 2006/0239689 A1 | 10/2006 | Ashdown | 398/130 |
| 2007/0058987 A1 | 3/2007 | Suzuki | 398/183 |
| 2007/0079135 A1 | 4/2007 | Saito | 713/183 |
| 2008/0276098 A1 | 11/2008 | Florencio et al. | 713/183 |

FOREIGN PATENT DOCUMENTS

| | | |
|---|---|---|
| EP | 1425866 | 11/2007 |
| JP | 2004363756 A | 12/2004 |
| JP | 2007251864 A | 9/2007 |
| WO | 9511558 | 4/1995 |
| WO | 2006079199 | 8/2006 |
| WO | 2008001262 | 1/2008 |

OTHER PUBLICATIONS

Korean Office Action, Korean Patent application No. 10-2010-7021731, 3 pages, Jan. 27, 2012.

International Search Report and Written Opinion for Application No. PCT/EP2009/052220 (14 pages), Jun. 26, 2009.

Anonymous, "IEEE Standard for a Precision Clock Synchronization Protocol for Networked Measurement and Control Systems", IEEE Std 1588-2008; 10 pages, 2008.

German Office Action, German Patent Application No. 10 2010 033 232.1-53; 2 pages, Jan. 4, 2011.

International PCT Search Report and Written Opinion, PCT/EP2011/062641, 10 pages, Sep. 6, 2011.

Krawczyk, H., et al., Network Workine Group, "HMAC: Keyed-Hashing for Message Authentication", 11 pages, Feb. 1997.

* cited by examiner

METHOD FOR NON-FLUTTER TRANSMISSION OF DIGITAL DATA IN A FREE-SPACE OPTICAL TRANSMISSION SYSTEM

CROSS-REFERENCE TO RELATED APPLICATIONS

This application is a U.S. National Stage Application of International Application No. PCT/EP2009/052220 filed Feb. 25, 2009, which designates the United States of America, and claims priority to DE Application No. 10 2008 011 823.0 filed Feb. 29, 2008. The contents of which are hereby incorporated by reference in their entirety.

TECHNICAL FIELD

The field of the invention is communications and relates to a method for transmitting digital data in a free-space optical transmission system.

BACKGROUND

Against the background of a continuously growing volume of data, optical transmission systems are being increasingly used, as they provide very high data rates compared to the bandwidth of electric cables. In optical transmission systems, light waves modulated with the data to be transmitted are generated, coupled into an optical waveguide generally consisting of glass or polymers, and transmitted to the receiver. In practice, wireline optical transmission systems often lack a desirable degree of flexibility.

In recent years, wireless optical transmission systems commonly known as "free-space optical transmission systems" are being increasingly considered for practical applications. In free-space optical transmission systems, the modulated light waves are not coupled into an optical waveguide, but launched into free space and received by a photodetector.

For optical transmission of digital data (binary data), the data is converted in two steps, a serial code sequence (coded sequence of binary data) first being produced by means of an encoding technique and then modulated onto the light waves using a modulation scheme (amplitude, frequency or phase modulation).

Encoding ("line coding") of the digital data is performed in practice in two ways: either the individual binary values or else the transitions of binary values are encoded as signal levels. In the first case, a so-called NRZ technique (NRZ=non-return-to-zero-level), for example, is used in which a logical "0" is encoded with a low signal level and a logical one "1" with a high signal level. In the second case, so-called Manchester coding is used, for example, whereby each bit period is split into two halves, a logical "1" being represented by a low signal level at the start and a high signal level at the end, and a logical zero "0" in a correspondingly vice versa manner.

If NRZ-encoded data is converted into an amplitude-modulated optical signal, a logical "0" is transmitted with a low signal level (light of little or no intensity) and a logical "1" with a high signal level (light of high intensity). If longer sections (bit blocks) each with the same logical value occur in an NRZ-encoded bit sequence, e.g. "1111110000000", which contains two longer bit blocks of the logical values "1" and "0", the light intensity of the optical signal remains unchanged during these bit blocks. In the case of optical transmission in the visible wavelength range, this may be perceived by the viewer as flutter or flicker if the light wave modulation frequency determined by the bit sequence is less than approximately 70 hertz. This can cause the viewer discomfort and even trigger epileptic fits, as medical studies have shown.

SUMMARY

According to various embodiments, a method for transmitting digital data in a free-space optical transmission system can be provided which enables an optical signal to be transmitted without flutter or flicker in the visible wavelength range.

According to an embodiment, in a method for transmitting digital data in a free-space optical transmission system, amplitude-modulated light waves are transmitted over a free-space optical link between a transmitter and a receiver using a binary code sequence generated from the digital data, wherein the binary code sequence is generated such that a modulation frequency of the light waves which is determined by the binary code sequence is at least 70 hertz.

According to a further embodiment, the binary code sequence can be generated such that a modulation frequency of the light waves which is determined by the binary code sequence is at least 100 hertz. According to a further embodiment, light waves with a visible wavelength can be transmitted. According to a further embodiment, the method may comprise the following steps: —generating a first binary code sequence from the digital data in an encoder by means of an encoding technique; —converting the first binary code sequence into a second binary code sequence in a code sequence converter by means of a code conversion scheme such that a light wave modulation frequency determined by the second binary code sequence is at least 70 hertz, wherein, in the code conversion scheme, first binary data blocks of selectable block length are replaced by selectable second binary data blocks assigned to the first binary data blocks on a one-to-one basis; —modulating the intensity of the light waves with the second code sequence in a modulatable light source of the transmitter; —receiving and demodulating the light waves in the receiver to recover the second code sequence; —converting the second code sequence back into the first code sequence in a code sequence back-converter by means of the inverse code conversion scheme, wherein the second binary data blocks are replaced by the first binary data blocks; and —generating the digital data from the first binary code sequence using the inverse encoding technique. According to a further embodiment, the binary second code sequence can be selected such that a light wave modulation frequency determined by the binary second code sequence is at least 100 hertz. According to a further embodiment, the first binary code sequence can be generated from the digital data by means of a non-return-to-zero encoding technique. According to a further embodiment, the second binary code sequence can be generated by 4B/5B code conversion. According to a further embodiment, the second binary code sequence can be generated by 8B/10B code conversion. According to a further embodiment, the binary code sequence can be generated from the digital data by means of a return-to-zero encoding technique. According to a further embodiment, the binary code sequence can be generated from the digital data by means of a pulse position modulation technique.

According to another embodiment, in a method for transmitting digital data in a free-space optical transmission system, wherein amplitude-modulated visible light waves are transmitted over a free-space optical link between a transmitter and a receiver using a binary code sequence generated from the digital data, the method may comprise the following steps: —generating the binary code sequence from the digital data to be transmitted; —defining a guard interval with a selectable duration and subdividing the guard interval into at least a first and second time section; —defining a setpoint quantity of light to be transmitted during a same guard interval; —subdividing the binary code sequence into binary data blocks with a selectable block length; —modulating the intensity of the light waves with the binary code sequence and transmitting the modulated light waves binary data block by binary data block over the free-space link during the first time sections of the guard intervals; —determining for each guard interval the quantity of light to be transmitted or which is transmitted during the first time section, possibly summed for a plurality of binary data blocks, and calculating for each guard interval a quantity of light difference between the setpoint quantity of light and the quantity of light to be transmitted or which is transmitted during the first time section; —transmitting unmodulated light waves during the second time sections of each guard interval, the light intensities of the light waves being selected such that the light quantities transmitted correspond in each case to the quantity of light differences calculated.

According to a further embodiment of the above method, the guard interval may be no more than 14 milliseconds long. According to a further embodiment of the above method, the guard interval may be no more than 10 milliseconds long. According to a further embodiment of the above method, only light waves encoded with a single binary data block may be transmitted during the first time sections of the guard intervals in each case. According to a further embodiment, the light quantities transmitted during the first time sections of the guard intervals can be determined computationally. According to a further embodiment, the light quantities transmitted during the first time sections of the guard intervals can be determined by means of a photodetector.

According to yet another embodiment, a device for transmitting digital data in a free-space optical transmission system, may comprises means which are implemented such that a method as described above can be carried out.

BRIEF DESCRIPTION OF THE DRAWINGS

The invention will now be explained in greater detail using an exemplary embodiment and with reference to the accompanying drawings in which.

DETAILED DESCRIPTION

Figure 1:
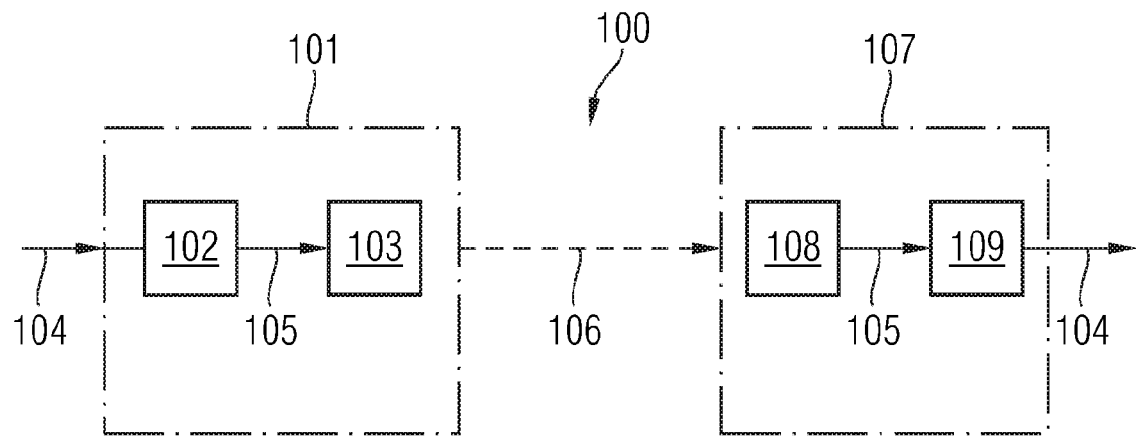
FIG. 1 schematically illustrates a free-space optical transmission system.

The various embodiments show, in generic terms, a method for transmitting digital data in a free-space optical transmission system in which in particular visible light waves are amplitude- or intensity-modulated with a binary code sequence generated from the digital data, and then transmitted over a free-space optical link between a transmitter and a receiver. A binary code sequence is defined as a sequence of binary values encoded by means of an encoding scheme.

According to a first aspect, the method according to various embodiments is essentially characterized in that the binary code sequence is generated such that a light wave modulation frequency determined by the binary code sequence, i.e. a rate of change of the signal levels (light intensities) of the light waves, is at least 70 hertz, preferably at least 100 hertz. The figure in hertz corresponds to signal level changes per second. The bit period, i.e. the time available for the optical transmission of a binary value, must be suitably selected to achieve the desired modulation frequency.

By means of the method according to a first aspect, visible optical signals can advantageously be transmitted flutter- or flicker-free over a free-space optical transmission system.

An further embodiment of the method comprises the following successive steps:

A first binary code sequence is first generated from the digital data to be transmitted in a transmitter-end encoder using a selectable encoding technique. The first binary code sequence is generated from the digital data using, for example, a non-return-to-zero encoding scheme.

The first binary code sequence is then converted into a second binary code sequence in a transmitter-end code sequence converter using a code conversion technique such that a light wave modulation frequency determined by the second binary code sequence is at least 70 hertz, preferably at least 100 hertz. In the code conversion method, first binary data blocks (bit blocks) of a selectable (identical) block length are replaced by selectable second binary data blocks which are assigned to the first binary data blocks on a one-to-one basis.

For example, 4B/5B code conversion (4B/5B=4 Binary/5 Binary) or 8B/10B code conversion (8B/10B=8 Binary/10 Binary) is carried out as the code conversion scheme. In the case of 4B/5B code conversion, a block of 4 binary values is converted into a block of 5 binary values such that no more than two consecutive logical zeros occur in each 5-bit block. In this process, 4-bit blocks are in each case assigned 5-bit blocks defined according to this requirement by means of a truth table. In the case of 8B/10B code conversion, a block of 8 binary values is converted into a block of 10 binary values such that a logical "0" occurs five times and a logical "1" occurs five times in each 10-bit block, at least three state changes being involved. In this process the 10-bit blocks are each assigned to 8-bit blocks by means of a truth table.

Next, the light wave intensity is modulated with the second code sequence in a modulatable light source of the transmitter. The light waves launched at the transmitter end are received and demodulated in the receiver to recover the second code sequence.

The second code sequence is then converted back into the first code sequence in a code sequence back-converter using the inverse code conversion scheme, the second binary data blocks being replaced by the first binary data blocks.

The digital data is then generated from the first binary code sequence using an inverse encoding technique.

This embodiment of the method is characterized by particularly simple technical implementation.

In another embodiment of the method, the binary code sequence is generated from the digital data by means of a return-to-zero encoding technique known per se to those skilled in the art. In the return-to-zero encoding scheme, a logical "0" is encoded with a low signal level and a logical one "1" is encoded with a high signal level, changeover to the low signal level taking place if a logical "1" is transmitted before the end of the pulse. The bit period is appropriately adjusted to achieve the required modulation frequency.

This embodiment of the method is characterized by another particularly simple technical implementation.

In another embodiment of the method, the binary code sequence can be generated from the digital data by means of a pulse position modulation technique known per se to those skilled in the art.

This embodiment of the method is characterized by another particularly simple technical implementation.

According to a second aspect, a generic method may comprise the following non-successive steps:

The binary code sequence is generated by means of a selectable encoding technique from the digital data to be transmitted.

The first binary code sequence is generated, for example, from the digital data using a non-return-to-zero encoding scheme.

A time period with a selectable duration, referred to here and in the following as a "guard interval", is specified which is subdivided into at least two time sections, a first time section and a second time section, with selectable durations.

The duration of an individual guard interval is preferably no more than 14 milliseconds, or even more preferably no more than 10 milliseconds. A setpoint quantity of light to be transmitted during a same guard interval is defined for the guard interval.

The binary code sequence generated is subdivided into sequential binary data blocks with a selectable block length that is preferably the same in each case.

The intensity or amplitude of the light waves is modulated with the binary code sequence generated and the modulated light waves are transmitted binary data block by binary data block over the free-space link during the first time sections of the guard intervals. In this case one or more binary data blocks (or rather the light waves modulated therewith) can be transmitted during a same first time section.

The quantity of light to be transmitted or transmitted during the first time section is determined for each binary data block and, in the event that a plurality of binary data blocks are transmitted during a same first time section, the light quantities to be transmitted or which are transmitted during a same first time section are summed for each guard interval. In the event that only a single binary data block (or rather the light waves encoded with said binary data block) is transmitted during a same first time section, the summation can be omitted. A quantity of light difference between the specified setpoint quantity of light and the possibly summed quantity of light to be transmitted or which is transmitted during the first time section is then calculated for each guard interval. The light quantities to be transmitted or which are transmitted during the first time sections of the guard intervals for each binary data block can be determined computationally at the transmitter end or by measurement by a photodetector at the receiver end.

During the second time sections of each guard interval, unmodulated light waves are transmitted, the light intensities of said light waves being selected such that the quantities of light transmitted in this case each correspond to the quantity of light differences calculated for a guard interval. It must be ensured that the duration of the second time section is not so short that the light waves cannot reach the receiver, i.e. the duration of the second time section must be longer than an inverse modulation bandwidth of the light source. In addition, the optical power necessary to produce the quantity of light difference must be selected such that a permissible maximum power for a light source generating the light waves is not exceeded.

The method according to a second aspect advantageously enables visible optical signals to be transmitted by a free-space optical transmission system without flutter or flicker that is perceptible to a viewer.

In a technically simple-to-implement embodiment of the method according to a second aspect, only a single binary data block (or rather the light waves encoded with that binary data block) is ever transmitted during the first time sections of the guard intervals in each case. Nevertheless, it may be preferable for a plurality of binary data blocks (or rather the light waves encoded with those binary data blocks) to be transmitted during the first time sections of the guard intervals in each case. In the event that a calculated quantity of light difference is zero, it is not necessary for unmodulated light waves to be transmitted during the second time sections of the guard intervals.

According to a another embodiment, a device, e.g. a free-space optical transmission system, for transmitting digital data in a free-space optical transmission system, may comprise means such as a transmitter with an amplitude-modulatable light source and a receiver with a photodetector which are designed such that a method as described above can be carried out.

A first exemplary embodiment according to a first aspect will now be described:

FIG. 1 schematically illustrates a free-space optical transmission system denoted as a whole by the reference numeral 100. The free-space optical transmission system 100 comprises a transmitter 101 with an amplitude-modulatable light source (e.g. a laser diode) 103 and a receiver 107 with a photodetector (e.g. a photodiode) 108.

The light source 103 is preceded by a combined encoder/converter 102 to which digital data (binary data) 104 is fed via a signal input (not shown).

In a first step, the binary data 104 undergoes NRZ encoding in the encoder/converter 102, resulting in the generation of a first serial code sequence (A) in the form of a serial sequence of encoded binary data to which, in a second step, 4B/5B conversion is then applied to produce a second serial code sequence (B) 105.

The second serial code sequence 105 is modulated onto a light beam 106 with a wavelength of e.g. 633 nm generated in the amplitude-modulatable light source, which light beam is launched into free space in the direction of the receiver 107. In the photodetector 108 of the receiver 107, the light beam is received and demodulated to recover the second serial code sequence B 105.

The photodetector 108 is followed by a combined decoder/back-converter 109 to which the recovered second code sequence (B) 105 is fed via a signal input (not shown). In the decoder/back-converter 109, the second code sequence (B) 105 is converted back into the first code sequence (A) by performing inverse 4B/5B conversion. The binary data 104 to be transmitted is recovered from the first code sequence (A) by applying the inverse NRZ encoding technique, said data being provided at a signal output (not shown) of the decoder/back-converter 109.

Figure 2A:
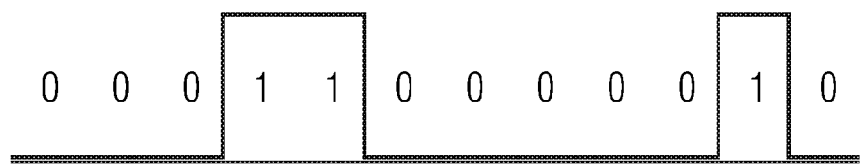
FIGS. 2a-2b shows NRZ encoding and 4B/5B conversion of a typical binary data sequence according to a first exemplary embodiment.
Figure 2B:
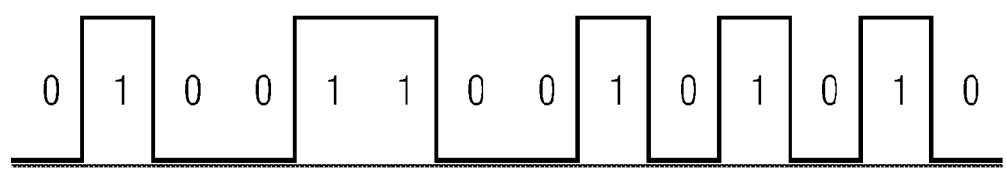

In FIG. 2, the encoding/conversion of the binary data 104 performed in the encoder/converter 102 is explained in more detail with reference to a typical bit string "000110000010". The upper diagram shows the NRZ encoding of this bit string, each logical "0" being encoded with a low signal level and each logical "1" with a high signal level to produce the binary code sequence (A). The result of this is that the binary code sequence (A) contains longer sections with the same signal level—here a sequence of five low signal levels, for example.

The NRZ-encoded binary code sequence (A) then undergoes 4B/5B conversion to produce the second serial code sequence (B). For the application of 4B/5B conversion, the binary code sequence (A) is subdivided sequentially into 4-bit blocks (binary words) each with 4 following binary values. The 4-bit blocks contained are replaced by 5-bit blocks which are allocated to the 4-bit blocks according to the following one-to-one truth table.

| 4-bit block | 5-bit block |
|---|---|
| 0000 | 11110 |
| 0001 | 01001 |
| 0010 | 10100 |
| 0011 | 10101 |
| 0100 | 01010 |
| 0101 | 01011 |
| 0110 | 01110 |
| 0111 | 01111 |
| 1000 | 10010 |
| 1001 | 10011 |
| 1010 | 10110 |
| 1011 | 10111 |
| 1100 | 11010 |
| 1101 | 11011 |
| 1110 | 11100 |
| 1111 | 11101 |

4B/5B conversion of binary code sequence (A) into binary code sequence (B) for the typical bit string is shown in the lower part of FIG. 2. It can be seen that longer sections of the same signal level are no longer present in the binary code sequence (B).

With a correspondingly selected bit period, this means that the modulation frequency for the intensity modulation of the light beam 106 is greater 100 hertz, so that more than 100 intensity changes occur per second and the light 106 beam is not perceived to flutter or flicker by the viewer.

Figure 3:
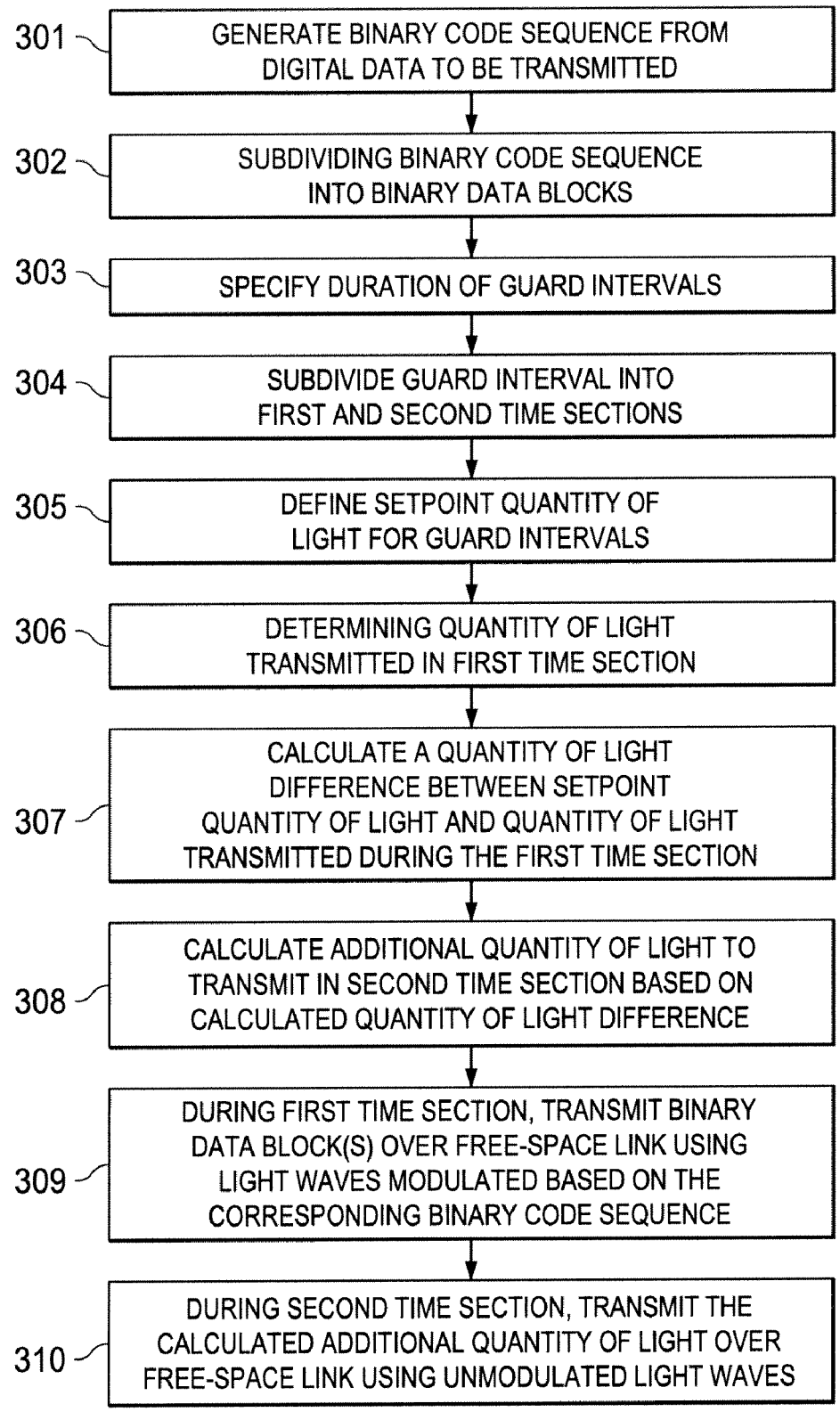
FIG. 3 shows a method for transmitting digital data in a free-space optical transmission system using a sequence of guard intervals each having a first time section and a second time section, wherein the digital data is transmitted as modulated light in the first time sections and non-modulated light is transmitted in the second time sections.

A second exemplary embodiment according to a second aspect will now be described with reference to FIG. 3:

Let it be assumed that a bit string "000110000010" generated from digital data (Step 301) is to be transmitted over a free-space optical link of a free-space optical transmission system as shown in FIG. 1. For this purpose the bit string is first NRZ-encoded to produce a binary code sequence, as shown in FIG. 2, upper section.

The binary code sequence is then subdivided into three four-bit blocks to produce the bit blocks "0001", "1000", "0010". (Step 302)

Each bit block is to be transmitted during a separate guard interval for which a duration of 10 milliseconds is specified. (Step 303) It is also specified that each guard interval is subdivided into two time sections of five milliseconds each, a bit block being transmitted during the first time section of a guard interval in each case. (Step 304) For the guard interval, a setpoint quantity of light (unit: joule or lumen-seconds) to be transmitted during the guard interval is specified. (Step 305) For example, 1 lumen-second is specified as the setpoint quantity of light for the guard interval here.

The quantity of light to be transmitted for each bit block is determined computationally at the transmitter end, which can be performed in a simple manner on the basis of the light intensities and bit periods used. (Steps 306 and 307) For example, the quantity of light transmitted for the three bit blocks is 0.4 lumen-seconds in each case.

For optical transmission of the binary code sequence, the first bit block is first modulated and transmitted with a total quantity of light of 0.4 lumen-seconds during the first time section of the first guard interval. (Step 308) This is followed by the transmission of unmodulated light waves with a total of 0.6 lumen-seconds during the second time section of the first guard interval. (Step 309) The second bit block is transmitted in a corresponding manner, wherein amplitude-modulated light waves are transmitted during the first time section of the second guard interval with the second bit block, followed by transmission of unmodulated light waves during the second time section of the second guard interval with a light intensity resulting in a transmitted quantity of light of 0.6 lumen-seconds. Similarly, the third bit block is transmitted in a corresponding manner, wherein amplitude-modulated light waves are transmitted during the first time section of the third guard interval with the third bit block, followed by transmission of unmodulated light waves during the second time section of the third guard interval with a light intensity resulting in a transmitted quantity of light of 0.6 lumen-seconds.

| List of reference characters | |
|---|---|
| 100 | free-space transmission system |
| 101 | transmitter |
| 102 | encoder/converter |
| 103 | light source |
| 104 | binary data |
| 105 | code sequence |
| 106 | light beam |
| 107 | receiver |
| 108 | photodetector |
| 109 | decoder/back-converter |

What is claimed is:

1. A method for transmitting digital data in a free-space optical transmission system, wherein amplitude-modulated visible light waves are transmitted over a free-space optical link between a transmitter and a receiver using a binary code sequence generated from the digital data, the method comprising:

generating the binary code sequence from the digital data to be transmitted;

defining guard intervals having a selectable duration and subdividing each guard interval into at least a first and second time section;

defining a setpoint quantity of light to be transmitted during each guard interval;

subdividing the binary code sequence into binary data blocks with a selectable block length;

modulating the intensity of the light waves with the binary code sequence and using a transmitter to transmit the modulated light waves binary data block by binary data block over the free-space link during the first time sections of the guard intervals;

determining for each guard interval a quantity of light to be transmitted or which is transmitted during the first time section, and calculating for each guard interval a quantity of light difference between the setpoint quantity of light and the quantity of light to be transmitted or which is transmitted during the first time section; and using a transmitter to transmit unmodulated light waves during the second time section of each guard interval, the light intensities of the light waves being selected such that the light quantity transmitted in the second time section of each guard interval correspond to the quantity of light difference calculated for that guard interval.

2. The method according to claim 1, wherein each guard interval is no more than 14 milliseconds long.

3. The method according to claim 1, wherein each guard interval is no more than 10 milliseconds long.

4. The method according to claim 1, wherein only a single binary data block is transmitted during the first time section of each guard interval.

5. The method according to claim 1, wherein the light quantities transmitted during the first time sections of the guard intervals are determined computationally.

6. The method according to claim 1, wherein the light quantities transmitted during the first time sections of the guard intervals are determined using a photodetector.

7. A system for transmitting digital data in a free-space optical transmission system using a sequence of guard intervals each having a first time section and a second time section, wherein the digital data is transmitted in the first time sections of the guard intervals, the system comprising:
a transmitter configured to:
generate a binary code sequence for digital data to be transmitted;
subdivide the binary code sequence into binary data blocks;
for each guard interval, modulate the intensity of the light waves based on the binary code sequence of at least one binary data block and transmit the modulated light waves corresponding to the at least one binary data block over the free-space link during the first time section;
for each guard interval, determine a quantity of light to be transmitted or which is transmitted during the first time section of that guard interval and calculate a quantity of light difference between a setpoint quantity of light and the determined quantity of light to be transmitted or which is transmitted during the first time section; and
for each guard interval, transmit unmodulated light waves during the second time section of that guard interval, the light intensity of the unmodulated light waves being selected such that the light quantity transmitted in the second time section corresponds to the quantity of light difference calculated for that guard interval.

8. The system according to claim 7, wherein each guard interval is no more than 14 milliseconds long.

9. The system according to claim 7, wherein each guard interval is no more than 10 milliseconds long.

10. The system according to claim 7, wherein only a single binary data block is transmitted during the first time section of each guard interval.

11. The system according to claim 7, wherein the light quantities transmitted during the first time sections of the guard intervals are determined computationally.

12. The system according to claim 7, wherein the light quantities transmitted during the first time sections of the guard intervals are determined using a photodetector.

13. A method for transmitting digital data in a free-space optical transmission system using a sequence of guard intervals each having a first time section and a second time section, wherein the digital data is transmitted in the first time sections of the guard intervals, the method comprising:
generating a binary code sequence for digital data to be transmitted;
subdividing the binary code sequence into binary data blocks;
for each guard interval, modulating the intensity of the light waves based on the binary code sequence of at least one binary data block and using a transmitter to transmit the modulated light waves corresponding to the at least one binary data block over the free-space link during the first time section;
for each guard interval, determining a quantity of light to be transmitted or which is transmitted during the first time section of that guard interval and calculating a quantity of light difference between a setpoint quantity of light and the determined quantity of light to be transmitted or which is transmitted during the first time section; and
for each guard interval, using a transmitter to transmit unmodulated light waves during the second time section of that guard interval, the light intensity of the unmodulated light waves being selected such that the light quantity transmitted in the second time section corresponds to the quantity of light difference calculated for that guard interval.

14. The method according to claim 13, wherein only a single binary data block is transmitted during the first time section of each guard interval.

15. The method according to claim 13, wherein multiple binary data blocks are transmitted during the first time section of at least some guard intervals.

16. The method according to claim 13, wherein different numbers of binary data blocks are transmitted during the first time section of different guard intervals.

17. A method for transmitting digital data in a free-space optical transmission system using a sequence of guard intervals each having a first time section and a second time section, wherein the digital data is transmitted in the first time sections of the guard intervals, the method comprising:
generating a binary code sequence for digital data to be transmitted;
subdividing the binary code sequence into binary data blocks;
for each guard interval in the sequence of guard intervals:
during the first time section of the guard interval, using a transmitter to transmit at least one binary data block over the free-space link using light waves modulated based on the binary code sequence of the at least one binary data block; and
calculating a total quantity transmitted during the first time section of the guard interval with respect to the at least one binary data block, the determination being performed before or after the actual transmission of the at least one binary data block; and
calculating an additional quantity of light based on the determined total quantity transmitted during the first time section of the guard interval; and
during the second time section of the guard interval, using a transmitter to transmit the calculated additional quantity of light over the free-space link.

18. The method according to claim 17, wherein only a single binary data block is transmitted during the first time section of each guard interval.

19. The method according to claim 17, wherein multiple binary data blocks are transmitted during the first time section of at least some guard intervals.

20. The method according to claim 17, wherein different numbers of binary data blocks are transmitted during the first time section of different guard intervals.

* * * * *